United States Patent Office 3,148,158
Patented Sept. 8, 1964

3,148,158
PROCESS OF PREPARING ACID ACTIVATED CLAY CATALYST
Leslie M. Schenck, Mountainside, Harry Kaplan, Westfield, and John A. Hodgkiss, Oldbridge, N.J., assignors to General Aniline & Film Corporation, New York, N.Y., a corporation of Delaware
No Drawing. Filed Dec. 29, 1961, Ser. No. 163,053
7 Claims. (Cl. 252—450)

This invention relates to the process of acid activating mineral clays as catalysts for the alkylation of phenolic compounds and in the conversion of hydrocarbon oils.

It is well known that clays of the bentonite type are first activated by treatment with mineral acids such as hydrochloric, sulfuric, etc., under one or more steps of varying conditions of temperature, etc., to produce bleaching earths and active catalyst materials for cracking high-boiling liquid hydrocarbons and in the alkylation of phenolic compounds. In substantially all of the known activation processes, i.e., acid treatment, the mineral acid is added to an aqueous suspension of clay, or diluted mineral acid added directly to the raw or dried clay, and the bleaching conducted at various temperatures.

Bentonite clay, of which the usually characteristic mineral is montmorillonite, is essentially a hydrated aluminosilicate and has the composition:

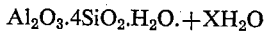

$$Al_2O_3.4SiO_2.H_2O.+XH_2O$$

Many clays which contain montmorillonite type minerals have been termed bentonite. These clays have a definite microcrystalline structure in which magnesium, aluminum, and silicon form a part of the crystal lattice, and in the interplanar areas between the lattices—in addition to a variable amount of water—there are present alkali metals such as calcium, magnesium, etc., which are associated with the lattice in an ionic or base exchange relationship. X-ray analyses have established the structural similarities, and it is now known that extensive substitution and replacements can take place within the lattice.

The process of activating bentonite clay generally involves the removal of detrital impurities such as the carbonates of magnesium, calcium, and iron, as well as other impurities which are present in varying amounts; the base-exchange ions; the lattice water; a part of the lattice magnesium; a part of the lattice aluminum, and little if any of the lattice silicon. It appears that the catalytic activity of a bentonite clay is not greatly developed until the crystal lattice is affected.

The acid activation, or acid pre-treatment, is usually effected by, but not necessarily restricted to, known processes such as are employed in the manufacture of decolorizing clays. Normally, the acid treatment (cold) is carried out on the mineral montmorillonite (bentonite), in finely divided form, while the mineral clay is suspended in water in the form of a slurry to which mineral acid such as hydrochloric or sulfuric acid is added or dilute mineral acid added directly to the finely divided mineral clay. In either case, the weight ratio of cold acid to dry mineral clay may vary from about 20 to 100% based on the anhydrous basis, but preferably the ratio is in the order of 30–40%. The mixture of the mineral clay and acid is heated to about 160 to 210° F. for a period of time ranging from 2 to 12 hours and thereafter water washed and filtered. Acid treatments of montmorillonite types of clay are described in United States Patents Nos. 1,397,113; 1,579,326; 1,642,871; 2,470,872; 2,472,489; 2,484,828; 2,553,239 and many others too numerous to mention, all of which are known to those skilled in the art. The acid treated clay, after drying in any known or desired manner, is then formed into aggregate masses such as by granulating, powdering, molding, extruding, and the like, and utilized as catalysts in the conversion of hydrocarbon oils and in alkylation of phenols with olefinic hydrocarbons.

Activation of natural mineral products, including clays of the kaolin as well as those of the montmorillonite class, with concentrated sulfuric acid is also known in which the raw clay is mixed with the acid followed by aging at elevated temperature to complete the sulfation reaction. The sulfated clay is then mixed with water to effect dissolution of the soluble sulfates. It has also been proposed to subject the sulfated clays to thermal decomposition at temperatures in excess of 1100° F. followed by acid solvent treatment to remove alumina and other acid components leaving a residue composed substantially of silica. In lieu of the acid solvent treatment, the sulfated clay may be subjected to treatment at elevated temperatures in the presence of reducing agents or organic hydroxy compounds miscible with sulfuric acid to effect decomposition of the metal sulfates and drive off the oxides of sulfur and other volatiles that may be present.

It is the principal object of the present invention to provide an improved method of acid activating mineral clays to yield a catalyst having unique activity in the alkylation of phenolic compounds and in the conversion of hydrocarbon oils.

Other objects and advantages will become manifest from the following description.

We have discovered that raw clays of the silica-alumina type, i.e., bentonite, montmorillonite, synthetic absorbent composites of silica-alumina, fuller's earth and all of the other similar clays commercially available under various brand names are readily, efficiently, and economically transformed into active clay catalysts by treating the clay in the presence of a small amount of water with a hydrolyzable inorganic or organic halide and in the presence of an organic compound as an inert diluent at a temperature ranging from ambient to 130° C.

For the purpose of the present invention we prefer to acid activate raw clays of the silicate-alumina type, the analysis of which, calculated on the volatile free basis, shows the following constituents:

| | Percent |
|---|---|
| Silica ($SiO_2$) | From 60–74.0 |
| Aluminum oxide ($Al_2O_3$) | From 12–22 |
| Ferric oxide | From 1.5–5.0 |
| Magnesium oxide (MgO) | From 1.0–7.0 |
| Calcium oxide (CaO) | From 0.25–3.0 |

Raw clays which conform to the foregoing analysis are commercially available and are obtained under several brand names, such as, for example, Pikes Peak (montmorillonite clay), Subbentonite from Cheto Mine in Arizona, Wyo-Ben from Wyoming Bentonite, Aquagel from Baroid Division of National Lead, Volclay from American Colloid Company, Panther Creek Bentonite from American Colloid Company, etc.

Suitable organic compounds which we can employ as inert diluents to acid activate the raw clay include aliphatic hydrocarbons, aromatic hydrocarbons, hydrogenated hydrocarbons, terpene hydrocarbons, halogenated hydrocarbons, alcohols, aldehydes, acids, esters, ketones, ethers, acetals, nitrated hydrocarbons, and mixtures of the same. The organic compounds which are unsuitable are those which interfere with the effect of the acid on the raw clay. For all practical purposes the compound should be a liquid at the activating temperature. The compound can be a solid at room temperatures, but its melting point should be within the activating temperature range. For example, docosenol, a twenty-two carbon atom alcohol, has a melting point of 70.8° C. In using this alcohol, one would first melt it and then perform the various steps of the activation at temperatures exceeding 71° C.

The acid activation of the raw clay in accordance with the present invention is accomplished by adding one part by weight of the raw clay, which is usually in powdered form, to from 1 to 5 parts by weight of the organic compound as inert diluent, preferably in liquid form, in any suitable container. The mixture is stirred or agitated in any conventional manner at atmospheric, sub-atmospheric, or super-atmospheric pressures and the resulting slurry or suspension is treated with from about 0.01 to 1 part by weight of the raw clay of a hydrolyzable inorganic or organic halide, in conjunction with 0.01 to 1 part by weight of water. The resulting slurry or suspension is then agitated or stirred by any conventional means and heated to a temperature ranging from ambient to about 130° C. for a period of time ranging from ½ to 10 hours. The actual time required to complete the activation will depend upon the nature or character of the organic compound employed as the inert-diluent. For example, if such organic compoud is a lower aliphatic alcohol or a low-boiling aliphatic ketone, low-boiling ester, low-boiling chlorinated hydrocarbon, etc., the activation reaction takes place at lower temperatures with a shorter period of contact time. The actual temperature employed in many instances will be the reflux temperature of the slurry or suspension.

As examples of organic compounds which are employed as the inert solvent-diluents to form the slurry or suspension of the raw clay for the acidification reaction, the following are illustrative:

ALIPHATIC HYDROCARBONS OF FROM 1 TO 22 CARBON ATOMS

Methane
Propane
Hexane
Heptane
Octane
Nonane
Decane
Dodecane
Octadecane
Eicosane
Docosane
2,2-dimethylbutane
2,3-dimethylbutane
2-methylpentane
3-methylpentane
2,2-dimethylpentane
3,3-dimethylpentane
2,4-dimethylpentane
2-methylhexane
3-methylhexane
2,5-dimethylhexane
2-methylheptane
3-ethylpentane

CYCLIC ALIPHATIC HYDROCARBONS OF FROM 3 TO 24 CARBON ATOMS

Cyclopropane
Cyclohexane
Methylcyclopentane
Ethylcyclobutane
1-ethyl-2-methylcyclopropane
1,1,2-trimethylcyclopropane
1,2,3-trimethylcyclopropane
Cycloheptane
Methylcyclohexane(hexahydrotoluene)
1,1-dimethylcyclopentane
1,2-dimethylcyclopentane
1,3-dimethylcyclopentane
Cyclooctane
Nonylcyclohexane
Dodecylcyclohexane
Octadecylcyclohexane
1,2-dimethylcyclohexane(hexahydro-o-xylene)
1,3-dimethylcyclohexane(hexahydro-m-xylene)
1,4-dimethylcyclohexane(hexahydro-p-xylene)
Ethylcyclohexane (hexahydroethylbenzene)
Ethylmethylcyclopentane
1,1,2-trimethylcyclopentane
Cyclononane
Propylcyclohexane (hexahydropropylbenzene)
1,2,4-trimethylcyclohexane(hexahydropseudocumene)
1,3,5-trimethylcyclohexane(hexahydromesitylene)
1-isopropyl-4-methylcyclohexane(p-methane)
1,2,4,5-tetramethylcyclohexane(hexahydrodurene)

AROMATIC HYDROCARBONS OF THE BENZENE SERIES OF FROM 6 TO 12 CARBON ATOMS

Benzene
Toluene
o-Xylene
m-Xylene
p-Xylene
Ethylbenzene
1,2,3-trimethylbenzene (himimellitene)
1,3,5-trimethylbenzene (mesitylene)
Propylbenzene
Isopropylbenzene (cumene)
1,2-ethylmethylbenzene
1,3-ethylmethylbenzene
1,4-ethylmethylbenzene
1,2,3,4-tetramethylbenzene (prehnitene)
1,2,4,5-tetramethylbenzene (durene)
p-Isopropylmethylbenzene (cymene)
1,4-methylpropylbenzene
Secondary butylbenzene
p-Diethylbenzene
Tertiary amylbenzene

HALOGENATED HYDROCARBONS OF FROM 1 TO 16 CARBON ATOMS

Chloroform
1,1-dichloroethane
1,2-dichloroethane
1,1,1-trichloroethane
1,1,2-trichloroethane
1,1,1,2-tetrachloroethane
1-iodooctane
Trichlorotrifluoroethane
Cetyl bromide
1,1,2,2-tetrachloroethane
Pentachloroethane
Butylchloride
Amylchloride
Hexylchloride
Iso-decylchloride
Lauryl bromide
Chlorobenzene
Bromobenzene

ALIPHATIC ALCOHOLS OF FROM 1 TO 22 CARBON ATOMS

Methyl alcohol
Ethyl alcohol
Propyl alcohol
Isopropyl alcohol
n-Butyl alcohol
Sec.-butyl alcohol
Tert.-butyl alcohol
Isobutyl alcohol
n-Amyl alcohol
Isoamyl alcohol
2-pentanol
3-pentanol
Citronellol
Octadecyl alcohol
d-Amyl alcohol
2-methyl-2-butanol(amylene hydrate)
1-hexanol
2-hexanol
2-methyl-1-pentanol
3,3-dimethyl-2-butanol
2,3-dimethyl-2-butanol
1-heptanol
1-octanol
1-nonanol
1-decanol
Cetyl alcohol
Docosenol
Cinnamyl alcohol ALIPHATIC AND AROMATIC KETONES
Acetone
Methylethyl ketone
Diethyl ketone
Methylpropyl ketone
Isopropylmethyl ketone
Tert.-butylmethyl ketone (pinacolin)
Acetyl acetone
Acetonyl acetone
Benzylphenyl ketone
Acetyl trimethylene
Cyclobutanone
Cyclopentanone
Cyclohexanone
Diamyl ketone
Acetophenone
Ethylphenyl ketone
Benzylmethyl ketone
Benzophenone
Dinonyl ketone ALIPHATIC AND AROMATIC ETHERS
Ethylpropyl ether
n-Propylether
n-Butylmethyl ether
Isoamyl ether
Acetalmethylal
Isopropyl ether
Ethyl phenyl ether
Phenetole
n-Butyl phenyl ether
Methyl Cellosolve
Butyl Cellosolve
Methyl isobutyl ether
Diisoamyl ether
Dioxane
Anisole
Phenyl octyl ether
Veratrole
β.β'-Dichlorodiethyl ether, etc.

Aliphatic esters such as methyl, ethyl, propyl, butyl, isopropyl and isobutyl acetates and propionates, butyl oxalate, methyl myristate, octadecyl acetate, eicosyl acetate, triethylorthoformate, etc., including aliphatic esters of alkyl alcohols of from 1 to 20 carbon atoms with either saturated or unsaturated organic monocarboxylic acids, such as, for example:

| | |
|---|---|
| Formic acid | Acrylic acid |
| Caprylic | Acetic acid |
| Propionic acid | Chloracetic acid |
| Capric acid | Butyric acid |
| Oxalic acid | Propionic acid |
| | Undecylic acid |

Aromatic alcohols of from 7 to 19 carbon atoms, such as, for example:

| | |
|---|---|
| Benzyl alcohol | 3-methyl-1-phenyl butanol |
| 2,4-xylenol | Ethyl phenyl carbinol |
| Phenethyl alcohol | Methyl phenyl carbinol |
| Dodecylbenzyl alcohol | Butyl phenyl carbinol |

Carboxylic acids of from 1 to 20 carbon atoms, such as, for example:

| | |
|---|---|
| Formic acid | Undecylic acid |
| Acetic acid | Oleic acid |
| Propionic acid | Stearic acid |
| Pentanoic acid | Palmitic acid |
| | Eicosanoic acid |

ALIPHATIC AND AROMATIC ALDEHYDES OF FROM 1 TO 18 CARBON ATOMS

| | |
|---|---|
| Formaldehyde | Stearaldehyde |
| Acetaldehyde | Cyclohexanecarboxaldehyde |
| Hendecanal | Benzaldehyde |
| Tetradecyl aldehyde | p-Tolualdehyde |
| Nonyl aldehyde | 2-nitrobenzaldehyde |

AROMATIC ESTERS OF FROM 8 TO 23 CARBON ATOMS

| | |
|---|---|
| Benzly formate | Cetyl benzoate |
| Betal naphthyl acetate | Hexyl benzoate | may be employed as such or mixtures thereof.

As examples of hydrolyzable inorganic and organic halides, which in the presence of water hydrolyze to hydrogen chloride, hydrogen bromide, formic acid, acetic acid, benzenesulfonic and sulfurous acid, ethyl sulfuric acid, trichloracetic acid, and the like, the following are illustrative:

| | |
|---|---|
| Aluminum chloride | Titanium tetrachloride |
| Ferric chloride | Stannous chloride |
| Acetyl chloride | Benzenesulfonyl chloride |
| Thionyl chloride | p-Toluene sulfonyl chloride |
| Chlorosulfonic acid | Benzoyl chloride |
| Ethyl chloroformate | Acetyl bromide |
| Myristoyl chloride | Phosgene |
| Ethyl chlorosulfate | Trichloroacetyl chloride |
| Phosphorous oxychloride | Borontrichloride |

It is to be noted that the nature or character of the organic compounds we employ as inert diluents to form the slurry or suspension of the raw clay for the acidification reaction is immaterial so long as such compounds per se or in admixture are free from basic groups or substituents.

The following examples will illustrate the operation of the activation of clay catalysts by the method of the present invention. All parts given are by weight.

EXAMPLE I

A 2-liter flask equipped with agitator, thermometer, and water-cooled reflux condenser was charged with 150 parts of Aquagel, source Baroid Div., National Lead, 400 parts of acetone, 12 parts of thionyl chloride, and 12 parts of water. The mixture was heated at 58° C. for 3 hours. It was then filtered through #3 filter paper on a Buchner funnel. The filter cake was removed and dried in the atmosphere at room temperatures for 24 hours. The dried catalyst was hammermilled.

*Alkylation A*

A 1-liter 4-necked flask equipped with agitator, thermometer, and water-cooled reflux condenser was charged with 126 parts of nonene (1.0 M), 141 parts of phenol USP (1.5 m), and 40 parts of catalyst from Example I. The mixture was heated at 90° C. with agitation for a period of 5 hours. The catalyst was removed by filtration. 204.0 parts of the filtrate were fractionated at 10 mm. pressure through a laboratory Vigreux column, providing 17 theoretical plates to yield 152.0 parts of nonylphenol distilling over the range 155° C. to 181° C. at 10 mm. and having refractive index $N_D^{25}=1.5110$. Yield: 90.5%.

*Alkylation B*

A 1-liter 4-necked flask equipped with agitator, thermometer, and water-cooled reflux condenser was charged with 168 parts of dodecene (1.0 m), 141 parts of phenol USP (1.5 m), and 50 parts of catalyst from Example I. The mixture was heated at 70° C. with agitation for a period of 8 hours. The catalyst was removed by filtration. 241.5 parts of the filtrate were fractionated at 10 mm. pressure through a laboratory Vigreux column, providing 17 theoretical plates to yield 164.2 parts of dodecylphenol distilling over the range 178° C. to 220° C. at 10 mm. and having refractive index $N_D^{25}=1.5070$. Yield: 80.2%.

*Alkylation C*

Alkylation B was repeated with the exception that the reaction was performed in a stainless steel pressure vessel to enable the substitution of 42 parts propylene for 168 parts dodecene. There was obtained 133 parts of an alkylated phenol as product.

EXAMPLE II

A 2-liter 3-necked flask equipped with agitator, thermometer, and water-cooled reflux condenser was charged with 75 parts of bentonite, source Wyo-Ben Products Co., 250 parts of acetone, 26 parts of p-toluene sulfonyl chloride, and 5 parts of water. The mixture was heated at 58° C. for 3 hours. It was then filtered through #3 filter paper on a Buchner funnel. The filter cake was removed and dried in a vacuum dryer at 50° C. for 8 hours at 26° vacuum. The dried catalyst was hammer-milled.

*Alkylation A*

A 1-liter 4-necked flask equipped with agitator, thermometer, and water-cooled reflux condenser was charged with 252 parts of nonene (2.0 M), 235 parts of phenol (2.5 M), and 10 parts of catalyst from Example II. The mixture was heated at 95° C. with agitation for a period of 5 hours. The catalyst was removed by filtration. 403.2 parts of the filtrate were fractionated at 10 mm. pressure through a laboratory Vigreux column, providing 17 theoretical plates to yield 343.8 parts of nonylphenol distilling over the range 155° C. to 181° C. at 10 mm. and having refractive index $N_D^{25}=1.5110$. Yield: 94.4%.

*Alkylation B*

As a control, there were charged into a 1-liter 4-necked flask equipped with agitator, thermometer, and water-cooled reflux condenser 252 parts of nonene (2.0 M), 235 parts of phenol (2.5 M), 2.9 parts of p-toluene sulfonyl chloride (equivalent to 10 parts of catalyst of Example II), and 5.2 parts of water. The mixture was heated at 95° C. with agitation for a period of 5 hours. 360.0 parts of the filtrate were fractionated at 10 mm. pressure through a laboratory Vigreux column, providing 17 theoretical plates to yield 156.8 parts of nonylphenol distilling over the range 155° C. to 181° C. at 10 mm. and having refractive index $N_D^{25}=1.5110$. Yield: 48.3%.

EXAMPLE III

A 2-liter 3-necked flask equipped with agitator, thermometer, and water-cooled reflux condenser was charged with 75 parts of #49 Volclay bentonite (source Whittaker, Clark & Daniels), 250 parts of methyl ethyl ketone, 8.7 parts of chlorosulfonic acid, and 3.0 parts of water. The mixture was heated at 60° C. for 3 hours. It was then filtered through #3 filter paper on a Buchner funnel. The filter cake was removed and dried in the atmosphere at room temperatures for 24 hours. The dried catalyst was sifted through a #40 mesh screen and stored in an air-tight container.

*Alkylation A*

A 1-liter 4-necked flask equipped with agitator, thermometer, and water-cooled reflux condenser was charged with 126 parts of nonene (1.0 M), 117.5 parts of phenol USP (1.25 M), and 10 parts of catalyst from Example III. The mixture was heated at 90° C. with agitation for a period of 3 hours. The catalyst was removed by filtration. 201.5 grams of the filtrate were fractionated at 10 mm. pressure through a laboratory Vigreux column, providing 17 theoretical plates to yield 170.2 parts of nonylphenol distilling over the range 155° C. to 181° C. at 10 mm. and having a refractive index $N_D^{25}=1.5510$. Yield: 93.5%.

*Alkylation B*

A 1-liter 4-necked flask equipped with agitator, thermometer, dropping funnel, and water-cooled reflux condenser was charged with 216 parts of p-cresol (2.0 M) and 20 parts of catalyst from Example III. Into this mixture at 80° C. 224 parts of hexadecene-1 (1.0 M) were added over a period of 1 hour. The mixture was heated at 90° C. with agitation for a period of 4 hours. The catalyst was removed by filtration. 350.0 parts of the filtrate yielded 236.3 parts of hexadecyl cresol. Yield: 89.5%.

EXAMPLE IV

A 2-liter 3-necked flask equipped with agitator, thermometer, and water-cooled reflux condenser was charged with 75 parts of GB 100 Wyobond bentonite (source Archer-Daniels-Midland), 300 parts of 95% ethanol, and 21 parts of benzoyl chloride. The mixture was heated at 75° C. for 4 hours. It was then filtered through #3 filter paper on a Buchner funnel. The filter cake was removed and dried in the atmosphere at room temperatures for 48 hours. The dried catalyst was hammer-milled and stored in an airtight container.

*Alkylation*

A 1-liter 4-necked flask equipped with agitator, thermometer, dropping funnel, and water-cooled reflux condenser was charged with 117.5 parts phenol USP (1.25 M) and 60 parts of catalyst from Example IV. Into this mixture at 80° C. 82 parts of cyclohexene (1.00 M) were added over a period of 2.0 hours. The mixture was heated at 85° C. with agitation for a period of 2 hours. The catalyst was removed by filtration. 150.0 parts of the filtrate yielded 124.0 parts of cyclohexyl phenol. Yield: 93.6%.

EXAMPLE V 75 parts by weight of GB 100 Wyobond bentonite was converted to a catalytic clay by heating for 3 hours in an admixture of 500 parts by weight of lauryl alcohol, 20 parts by weight of water, and 15 parts by weight of ethylchloroformate. The catalyst was removed from the admixture by centrifuging and gave yields of cyclohexylphenol in excess of 90% when substituted for the catalyst from Example IV in the alkylation.

EXAMPLE VI 150 parts by weight of bentonite (Aquagel, Baroid Division of National Lead) were suspended in an admixture of 400 parts by weight of acetone and 3 parts by weight of water. There were added 28 parts by weight of acetyl bromide, and the mixture was heated at 58° C. for 3 hours. The catalyst was removed by filtration and air dried. 141 parts by weight of phenol and 126 parts by weight of commercial propylene trimer were reacted at 90° C. for 5 hours in the presence of 40 parts by weight of the air-dried catalyst to produce a phenol alkylate in excess of 90% of the theoretical yield.

EXAMPLE VII

The operations outlined under Example VI were repeated with the exception that 60 parts of myristoyl chloride were substituted for 28 parts of acetyl bromide. The resultant clay catalyzed the alkylation of phenol with propylene trimer in excess of 90% of the theoretical.

EXAMPLE VIII

The operations outlined under Example VI were repeated with the exception that 30 parts of phosgene were substituted for 28 parts of acetyl bromide. The resultant activated clay catalyzed the alkylation of phenol with propylene trimer in excess of 90% of the theoretical.

EXAMPLE IX

The operations outlined under Example VI were repeated with the exception that 35 parts of ethyl chlorosulfate were substituted for 28 parts of acetyl bromide. The resultant activated clay exhibited catalytic activity substantially equal to the product described under Example VI.

EXAMPLE X

The operations outlined under Example VI were repeated with the exception that 30 parts of trichloroacetylchloride were substituted for 28 parts of acetyl bromide. The resultant activated clay was substantially equal to the product resultant from Example VI.

EXAMPLE XI

The operations outlined under Example VI were repeated with the exception that 10 parts of phosphorus oxychloride were substituted for 28 parts of acetyl bromide. The resultant activated clay catalyzed the alkylation of phenol with propylene trimer in excess of 90% of the theoretical.

EXAMPLE XII

The operations outlined under Example VI were repeated with the exception that 7 parts of borontrichloride were substituted for 28 parts of acetyl bromide. The resultant activated clay catalyzed the alkylation of phenol with propylene trimer in excess of 90% of the theoretical.

EXAMPLE XIII

Example VI was repeated with the exception that 24 parts of acetyl fluoride were substituted for 28 parts of acetyl bromide.

EXAMPLE XIV

Example VI was repeated with the exception that 9 parts of aluminum chloride were substituted for 28 parts of acetyl bromide.

EXAMPLE XV

Example VI was repeated with the exception that 9 parts of titanium chloride were substituted for 28 parts of acetyl bromide.

EXAMPLE XVI

Example VI was repeated with the exception that 10 parts of ferric chloride were substituted for 28 parts of acetyl bromide.

EXAMPLE XVII

Example VI was again repeated with the exception that 10 parts of stannous chloride were substituted for 28 parts of acetyl bromide.

We claim:

1. The process of preparing an acidic clay catalyst of the silica-alumina type having activity in the alkylation of phenolic compounds which comprises treating 1 part by weight of a raw clay of the silica-alumina type in the presence of from 1 to 5 parts by weight of an inert organic compound free from basic substituents as a diluent, 0.01 to 1 part by weight of water and from about 0.01 to 1 part by weight of a hydrolyzable halide at a temperature ranging from ambient to 130° C.

2. The process according to claim 1 wherein the hydrolyzable halide is thionyl chloride.

3. The process according to claim 1 wherein the hydrolyzable halide is chlorosulfonic acid.

4. The process according to claim 1 wherein the hydrolyzable halide is benzoyl chloride.

5. The process according to claim 1 wherein the hydrolyzable halide is ethyl chloroformate.

6. The process according to claim 1 wherein the hydrolyzable halide is acetyl bromide.

7. The process according to claim 1 wherein the hydrolyzable halide is aluminum chloride.

References Cited in the file of this patent

UNITED STATES PATENTS

| | | |
|---|---|---|
| 2,018,987 | Wirzmuller | Oct. 29, 1935 |
| 2,934,504 | Talvenheimo | Apr. 26, 1960 |
| 2,988,519 | Robinson et al. | June 13, 1961 |